UNITED STATES PATENT OFFICE.

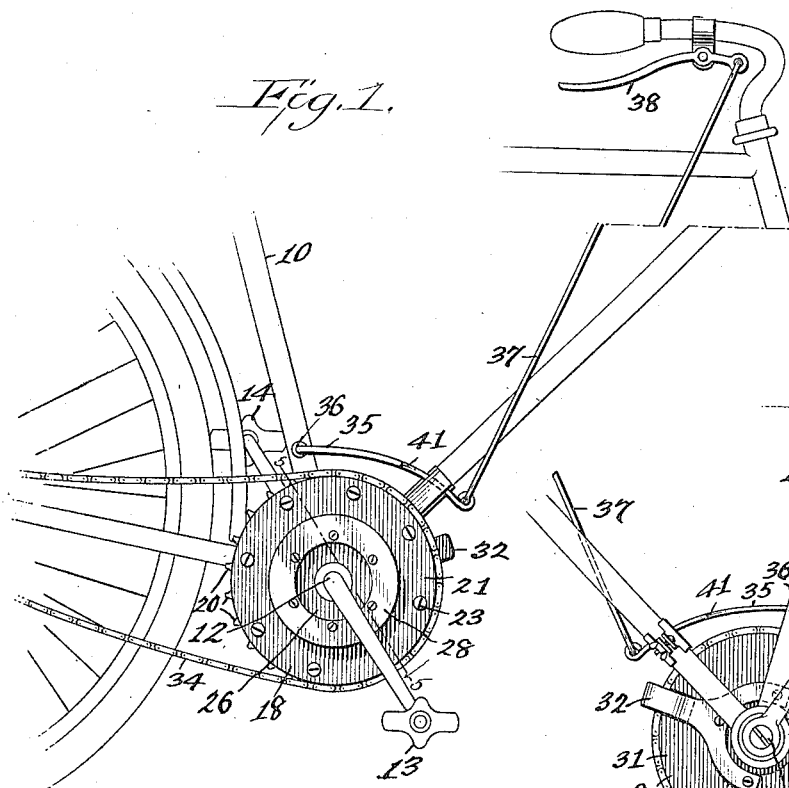
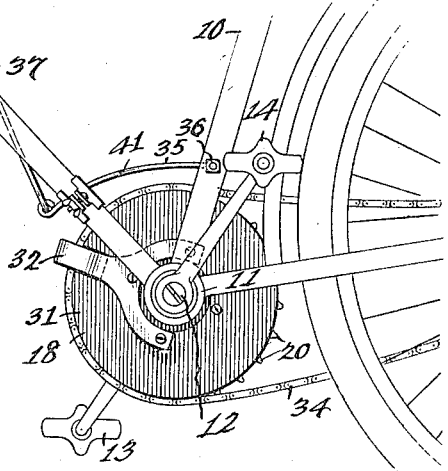
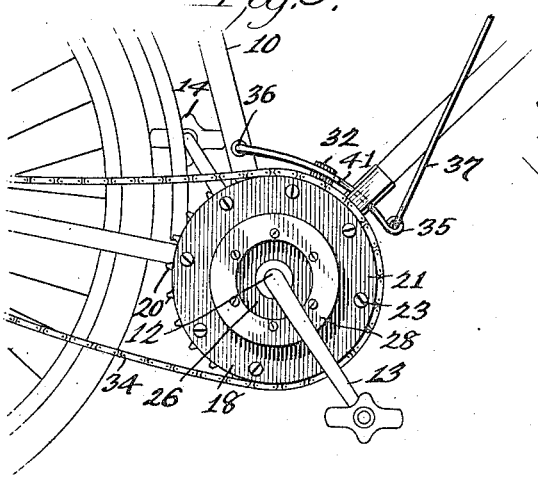
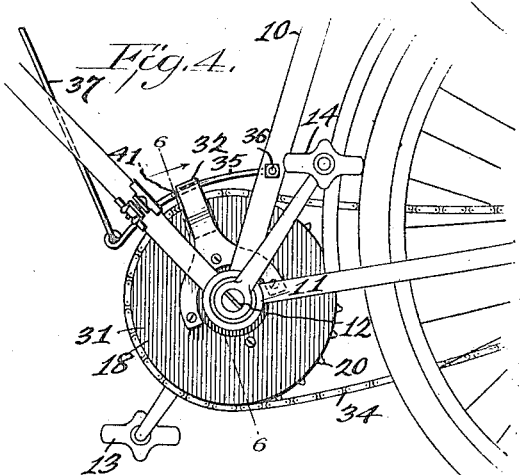

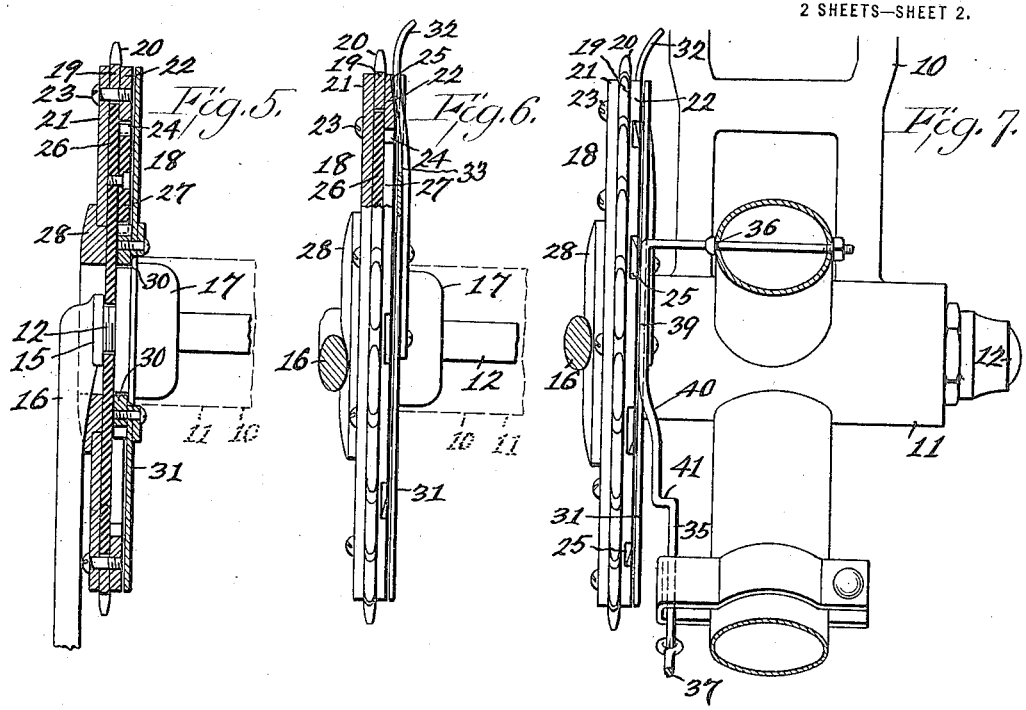
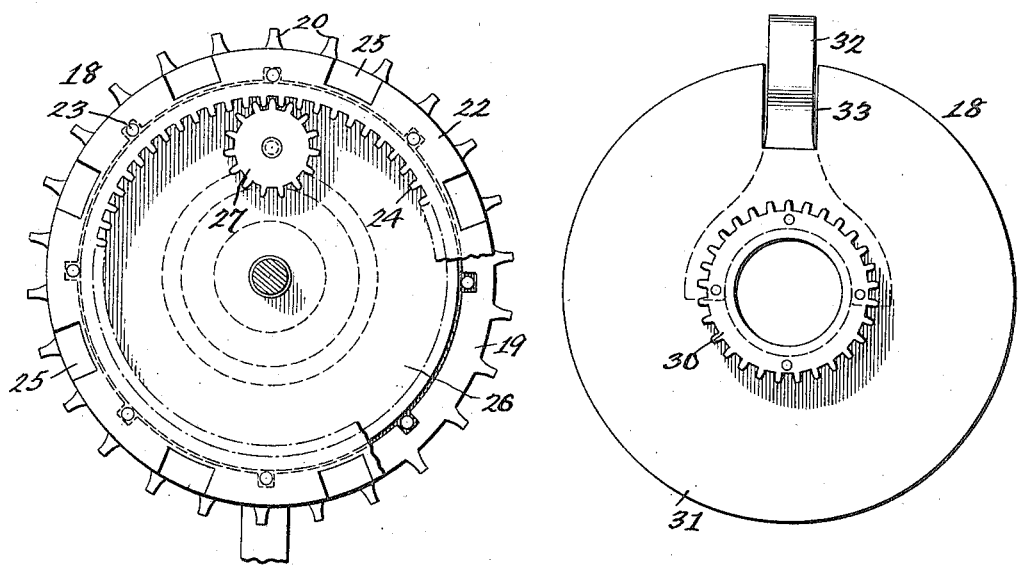

CHARLES F. RUNNER, OF BELLINGHAM, WASHINGTON.

SPROCKET.

1,234,572.  Specification of Letters Patent.  Patented July 24, 1917.

Application filed December 21, 1916.  Serial No. 138,183.

*To all whom it may concern:*

Be it known that I, CHARLES F. RUNNER, a citizen of the United States, and a resident of Bellingham, in the county of Whatcom and State of Washington, have invented certain new and useful Improvements in Sprockets, of which the following is a specification.

My invention relates to sprockets, such as are used on bicycles, and the main object thereof is to provide means for changing the speed of revolution from low to high and the reverse at will, and a further object is to provide means whereby, when in high speed and a coaster brake is applied, the sprocket is automatically shifted to low speed and, upon the continued forward pedal movement after brake release, said sprocket is again automatically shifted to high speed, and a still further object is to provide a sprocket of such construction as to adapt the same for ready substitution in place of a conventional sprocket now provided as a part of a bicycle, and occupying substantially the same space.

My invention is fully described in the following specification, of which the accompanying drawings form a part, in which like characters refer to like parts in each of the views, and in which:—

Figure 1 is a fragmentary right side elevation of a bicycle provided with my invention, in low speed;

Fig. 2 is a similar left side elevation;

Fig. 3 is a right side elevation, in high speed;

Fig. 4 is a similar left side elevation;

Fig. 5 is an enlarged section taken on the line 5—5 of Fig. 1;

Fig. 6 is a partial section taken on the line 6—6 of Fig. 4;

Fig. 7 is a top plan view;

Fig. 8 is a side view of the sprocket with a cover plate removed, and partly broken away to show details; and Fig. 9 is a view of the inner side of said cover plate with a sun gear and operating lever secured thereto.

Referring to the drawings, 10 represents the frame of a bicycle having the usual hanger 11 for the crank-shaft 12 having pedals 13 and 14 connected therewith in the usual or any desired manner, said crank-shaft being provided with a driving sprocket between the flange 15 of the crank 16 and the cone 17 rotatably held in the hanger, this sprocket being removed and the special sprocket 18 made in accordance with my invention substituted therefor.

The sprocket 18 consists of an annular plate 19 having teeth 20 thereon for the conventional chain and held between annular plates 21 and 22 the central opening in the former being materially less in diameter than that in the plate 19 and the opening in the latter being only slightly less in diameter than that in the plate 19, Fig. 5, all of said plates being secured together, as by screws 23. The annular plate 22 is provided with an internal gear 24 and with a plurality of radially arranged recesses 25 in its outer face for reasons to be explained.

Freely revoluble within the central opening in the plate 19 is an annular plate 26 the central opening through which fits the crank-shaft 12 and said plate 26 is detachably held between the flange 15 and the cone 17 whereby it revolves with the rotation of said crank-shaft, and said plate 26 carries a freely revoluble planet pinion 27 enmeshed with the internal gear 24, said plate 26 being held in relative position by means of a stepped plate 28 imprisoning the plate 21 between itself and the plate 26, though permitting free movement of the plate 21.

Revolubly held on the reduced portion of the cone 17 is a sun gear 30 secured to an annular cover plate 31 provided, on its outer face, with a lever 32 preferably forked and the bifurcations of which are secured to the plate 31 in order to allow movement of the lever arm toward and from the plate 31, said lever being of spring material the tendency of which is to hold said arm in a slot 33 in the plate 31 and in one of the radial recesses 25 when permitted to do so, and thus compel movement as a unit of the combined plates 19, 21 and 22, with the combined lever, plate 31, and sun gear 30, and because of the planet pinion 27 enmeshed with both the internal gear 24 and the sun gear 30 being immovably held when the said plates are so locked by the lever, all of said plates revolve with the plate 26 which is revolved by the crank-shaft in the pedal actuation, and a unitary sprocket results.

This is the normal or low speed condition of the device and, to shift to high speed, all that is necessary is to detach the lever 32 from the recessed plate 22 and hold the lever, plate 31, and sun gear 30, immovable and thereby compel planetary movement of the pinion 27 about the sun gear 30 to drive the internal gear 24 at a higher speed than that of the plate 26, which carries the planet pinion, and therefore at a higher speed than that of the crank-shaft, and, accordingly, the bicycle is driven faster through the chain 34.

To accomplish this lever release, I provide an arm 35 pivoted to the frame at 36 and adapted to be moved into the path of movement of the outer end of the lever 32 during the revolution of the device as a unit by means of a rod 37 and lever 38 located in a position convenient to the rider of the bicycle, said arm 35 having a portion 39 arranged in a plane outwardly of the curved end of the lever 32, an inclined portion 40 tending to draw the lever 32 out of engagement with the recessed plate 22, and a shoulder 41 for preventing forward movement of said lever 32 and thereby preventing revolution of the sun gear 30, with the aforesaid result of increasing the speed.

When, with bicycles equipped with coaster brakes, it is desired to utilize the same, the backward pressure on the pedal will cause the lever 32 to move away from the shoulder 41 and down the incline 40 to permit its re-engagement with the recessed plate 22 and thereby return the device to low speed automatically during the braking operation but, as soon as forward power is applied to the pedals with the arm 35 in high speed position, the lever 32 is again released from the recessed plate 22 and stopped by the shoulder 41 to automatically return the device to high speed.

While the planetary system of transmission is used in my invention, the particular purpose for and manner of use of this system is novel, and the ability to substitute my sprocket for a conventional sprocket without the need for specialized skill to convert an ordinary bicycle to a change speed bicycle is the acme of simplicity both in the ready installation and in the construction of my invention.

While not illustrated, I may employ anti-friction bearings in my device wherever deemed necessary, and I may vary the ratio of speeds by merely changing the ratio of the gears, this being entirely optional, and, while I have shown a preferred embodiment of the invention, I do not limit myself to such showing, as many changes may be made thereover provided such changes come within the spirit of the invention and within the scope of the appended claims.

Having fully described my invention, what I claim as new, and desire to secure by Letters Patent, is:—

1. In speed changing gearing, the combination of a toothed driven member, an internally toothed annular plate at one side of the driven member and rotatable therewith, a driving member concentric with the driven member the toothed driven member disposed in the plane of the said driving member, a planet pinion mounted on the driving member and enmeshed with the said internally toothed annular plate, a sun gear enmeshed with the planet pinion and disposed at the side of the driving member, a lever carried by the sun gear and normally connecting it with the said internally toothed annular plate to cause all to rotate together, and manually operable means to disconnect the said lever from the internal toothed annular plate and hold the lever and sun gear stationary, whereby to increase the speed of the driven member.

2. In speed changing gearing, the combination of a rotary driving member, an internally toothed driven member loosely mounted concentric with the driving member, a planet pinion carried by the driving member and enmeshed with the toothed portion of the driven member, a sun gear enmeshed with the planet pinion, a lever connected with the sun gear and normally forming connecting means between said sun gear and the driven member to cause all to rotate together, and manually operable means for disconnecting the lever from the driven member and holding such lever and sun gear stationary, whereby to increase the speed of the driven member, said means consisting of a member having a laterally inclined portion and a stop shoulder at one end of the incline for the said lever to engage.

3. A sprocket gear comprising three annular plates disposed side by side and connected for unitary rotation, a middle plate having outer teeth and one of the side plates having inner teeth, a driving member arranged between the side plates in the plane of the middle plate, a planet pinion mounted upon the driving member and enmeshed with the internally toothed side plate, a sun gear disposed in the plane of the planet pinion and internally toothed side plate and enmeshed with the said planet pinion, a lever rotatable with the sun gear and normally connecting it with the sprocket gear, and manually operable means for disconnecting the lever from the sprocket gear and holding the lever and sun gear stationary, whereby to increase the speed of the sprocket gear.

CHARLES F. RUNNER.

Copies of this patent may be obtained for five cents each, by addressing the "Commissioner of Patents, Washington, D. C."